United States Patent
Hawkes (10) Patent No.: US 10,220,520 B2
(45) Date of Patent: Mar. 5, 2019

(54) SURFACE GRASPING MECHANISM USING DIRECTIONAL ADHESIVES

(71) Applicant: The Board of Trustees of the Leland Stanford Junior University, Palo Alto, CA (US)

(72) Inventor: Elliot W. Hawkes, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 228 days.

(21) Appl. No.: 15/308,472

(22) PCT Filed: May 20, 2015

(86) PCT No.: PCT/US2015/031748
§ 371 (c)(1),
(2) Date: Nov. 2, 2016

(87) PCT Pub. No.: WO2015/179501
PCT Pub. Date: Nov. 26, 2015

(65) Prior Publication Data
US 2017/0066138 A1    Mar. 9, 2017

Related U.S. Application Data

(60) Provisional application No. 62/000,747, filed on May 20, 2014.

(51) Int. Cl.
*B25J 15/00* (2006.01)
*B64C 25/52* (2006.01)
*B64C 39/02* (2006.01)

(52) U.S. Cl.
CPC ............ *B25J 15/008* (2013.01); *B64C 25/52* (2013.01); *B64C 39/028* (2013.01); *B64C 2201/12* (2013.01); *B64C 2201/18* (2013.01); *Y10T 428/24802* (2015.01)

(58) Field of Classification Search
CPC ................... B25J 15/008; Y10T 428/24802
See application file for complete search history.

(56) References Cited

U.S. PATENT DOCUMENTS

| 7,762,362 | B2 | 7/2010 | Cutkosky |
| 9,517,610 | B2 * | 12/2016 | Parness ................... B32B 7/12 |
| 2012/0295068 | A1 | 11/2012 | Cutkosky |
| 2013/0068527 | A1 | 3/2013 | Parness |
| 2013/0134370 | A1 | 5/2013 | Leonard |
| 2014/0064905 | A1 | 3/2014 | Prahlad |
| 2014/0145196 | A1 | 5/2014 | Chang |
| 2014/0227473 | A1 | 8/2014 | Parness et al. |

OTHER PUBLICATIONS

Hawkes et al. 2013. Dynamic Surface Grasping with Directional Adhesion, IEEE/RSJ International Conference on Intelligent Robots and Systems (IROS). Tokyo, Japan, Nov. 3-7, 2013, pp. 5487-5493.

* cited by examiner

*Primary Examiner* — Gerard Higgins
(74) *Attorney, Agent, or Firm* — Lumen Patent Firm (57) ABSTRACT

Grasping devices and mechanisms are provided capable of grasping onto flat or curved surfaces repeatably and releasably using synthetic dry adhesives. Applications of these devices can be found in a large variety of robotic applications.

5 Claims, 9 Drawing Sheets

FIG. 3A – unloaded stalks

FIG. 3B – loaded stalks

FIG. 9C

SURFACE GRASPING MECHANISM USING DIRECTIONAL ADHESIVES

CROSS-REFERENCE TO RELATED APPLICATIONS

This application is a 371 of PCT/US2015/031748 filed on May 20, 2015. PCT/US2015/031748 claims the benefit of U.S. Provisional Application 62/000,747 filed on May 20, 2014.

STATEMENT OF GOVERNMENT SPONSORED SUPPORT

This invention was made with Government support under grant W911NF-08-2-0004 awarded by the Department of the Air Force, and under contracts 1161679 awarded by the National Science Foundation and NNN12AA01C awarded by the NASA to the Jet Propulsion Laboratory. The Government has certain rights in the invention.

FIELD OF THE INVENTION

This invention relates to grasping devices. In particular, the invention relates to grasping devices with directional adhesives.

BACKGROUND OF THE INVENTION

The ability to grasp flat or gently curved surfaces repeatably and releasably has several compelling robotic applications including, but not limited to, the perching of micro air vehicles (MAVs) on walls or ceilings and the grappling of objects in general or orbital debris in space. The present invention advances the art by providing grasping devices using directional adhesives for such applications.

SUMMARY OF THE INVENTION

A grasping device is described having a support frame with a top surface, a bottom surface and lateral sides. The support frame supports two synthetic dry adhesives, spaced from each other, underneath its bottom surface with the top surfaces of the adhesives facing the bottom surface of the support frame. A medial pre-tension tendon connects the medial sides of the first and second synthetic dry adhesive. Lateral pre-tension tendons connect the lateral side of the synthetic dry adhesives with the nearest lateral side of the support frame.

The support frame is compliant to apply a pre-tension to the first lateral pre-tension tendon, the second lateral pre-tension tendon and the medial pre-tension tendon.

The bottom surfaces of the synthetic dry adhesives have a plurality of stalks. Each of the stalks make an acute angle with the respective bottom surfaces and the respective lateral sides of the bottom surfaces such that the stalks are pointing to the lateral side of their respective synthetic dry adhesives and such that the acute angles of the stalks of the first synthetic dry adhesive are opposite from the acute angles of the stalks of the second synthetic dry adhesive. A pull tendon is connected near or at the middle of the medial pre-tension tendon, which is capable of pulling the medial and neighboring sides of the first and second synthetic dry adhesives closer to each other through the action of the medial pre-tension tendon by applying tension at the medial sides of the first and second synthetic dry adhesives. It is tension in the medial pre-tension tendon that pulls the tile medially. The pull on the pull tendon increases tension in the medial pre-tension tendon, such that the tension in the medial pre-tension tendon is now greater than the tension in the lateral pre-tension tendons, which results in a net shear force on the tile, which loads the adhesives in shear. An increase pull force at the pull tendon increases the angle of the medial pre-tension tendon with respect to the horizontal, which increases the normal component of force applied to the contact surface. It is this force that supports external loads applied to the pull tendon.

BRIEF DESCRIPTION OF THE DRAWINGS

FIGS. 5A-B show according to an exemplary embodiment of the invention a collapsing truss grasper.

FIGS. 6A-B shows according to an exemplary embodiment of the invention a MAV pivot linkage grasper (FIG. 6A).

FIGS. 7A-B FIG. 7A shows that a light contact allows the tips of the stalks or microwedges to engage with a surface (micrograph shown at right).

FIGS. 8A-D FIG. 8A shows a diagram of the opposed controllable adhesive gripper or grasping device.

FIG. 9A-C FIG. 9A shows a time history of normal and shear forces that one tile of a two tile gripper exerts on a surface. Insets show forces during engagement and release (only the weight of the device is perceptible).

DETAILED DESCRIPTION

Figure 1A:
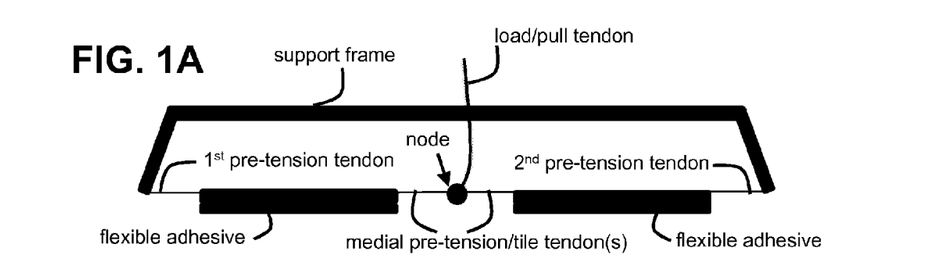
FIG. 1A shows a grasping device according to a first exemplary embodiment of the invention.
Figure 2A:
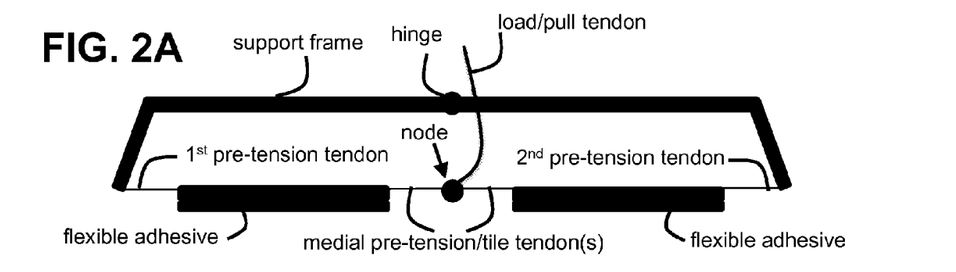
FIG. 2A shows a grasping device according to a second exemplary embodiment of the invention.

FIGS. 1A and 2A show examples of a grasping device. In these examples, a pair of synthetic dry adhesives (first and second) also referred to as directional (flexible) adhesives are arranged and supported by a support frame. Each directional adhesive has a plurality of stalks. The process of making and using these stalks is described infra.

Figure 3A:
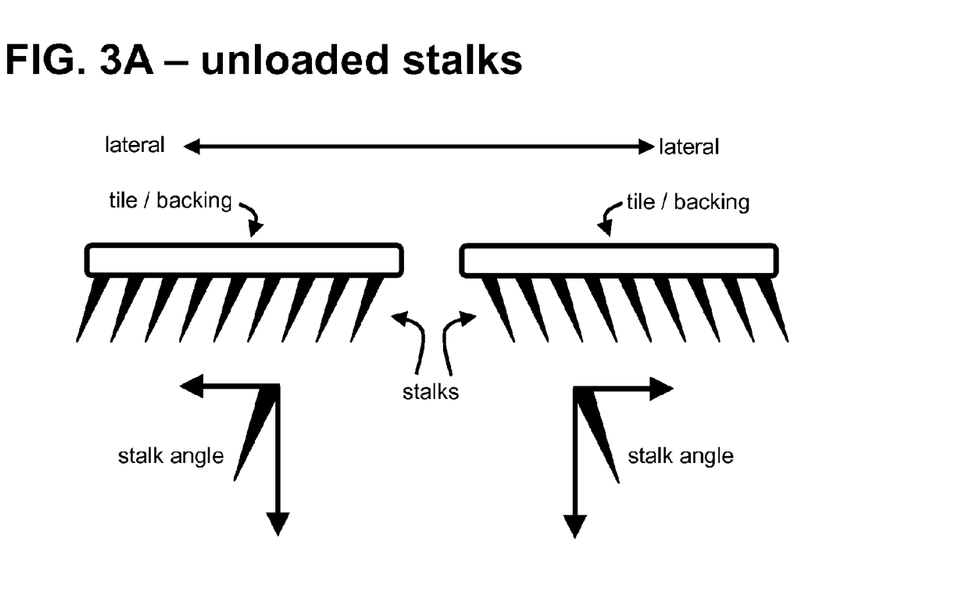
FIGS. 3A-B show according to an exemplary embodiment of the invention a plurality of stalks in an unloaded position (FIG. 3A, not in contact with a surface) relative to a loaded position (FIG. 3B, e.g. grasping a surface).

For the purpose of the grasping device, each of the stalks make an acute angle with the respective bottom surfaces and the respective lateral sides of the bottom surfaces of the synthetic dry adhesives such that the stalks are pointing to the lateral side of their respective synthetic dry adhesives and such that the acute angles of the stalks of a first synthetic dry adhesives are opposite from the acute angles of the stalks of a second synthetic dry adhesives (FIG. 3A).

In the examples of FIGS. 1A-D and 2A-D, a tendon/wire (string, cord, rope or the like) was used to separate the synthetic dry adhesives and keep them aligned with respect to the support frame. The synthetic dry adhesives are connected by a pull mechanism or a load tendon (FIGS. 1B-C and 2B-C), which is capable of pulling the medial and neighboring sides of the synthetic dry adhesives closer to each other by pulling on the interconnecting wire and when the flexible adhesive contact a surface. While the medial and neighboring sides of the synthetic dry adhesives are pulled closer to each other, the stalks of the first and second synthetic dry adhesives are loaded (FIG. 3B) with internal shear forces applied to a contact surface in opposite directions from each other, and wherein the opposite shear forces result in a normal force allowing the grasper device to grasp onto the contact surface.

Figure 1B:
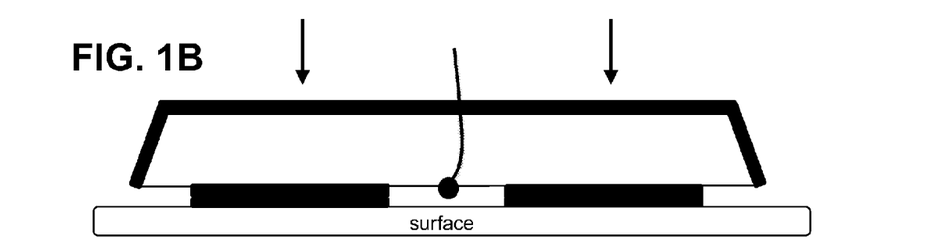
FIG. 1B-D show a grasping cycle where the grasping device (FIG. 1A) approaches (FIG. 1B) a flat surface, grasps onto (FIG. 1C) the flat surface and releases from the flat surface (FIG. 1D).
Figure 1C:
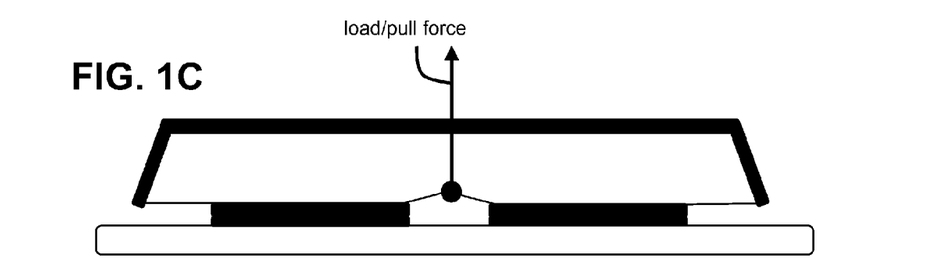
Figure 1D:
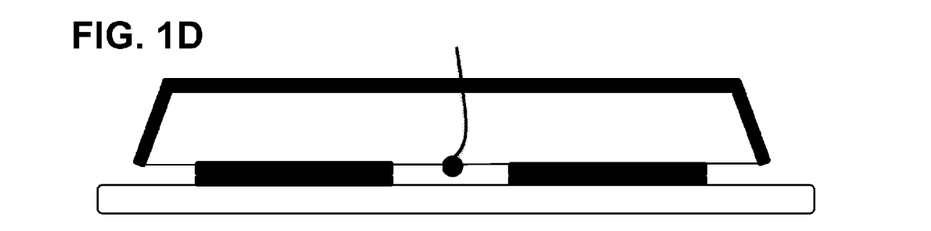
Figure 2B:
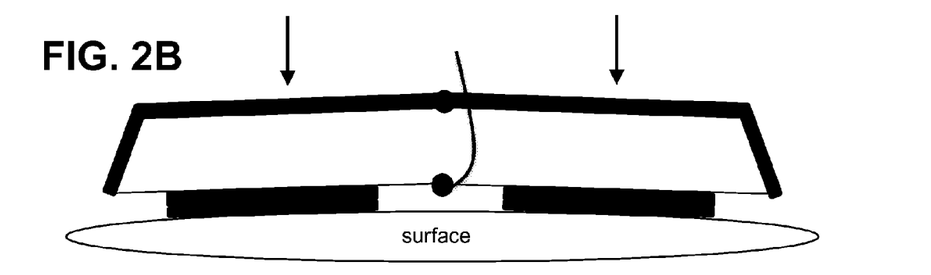
FIG. 2B-D show a grasping cycle where the grasping device (FIG. 2A) approaches (FIG. 2B) a curved surface, grasps onto (FIG. 2C) the curved surface and releases from the curved surface (FIG. 2D) by pulling up from the lateral sides.
Figure 2C:
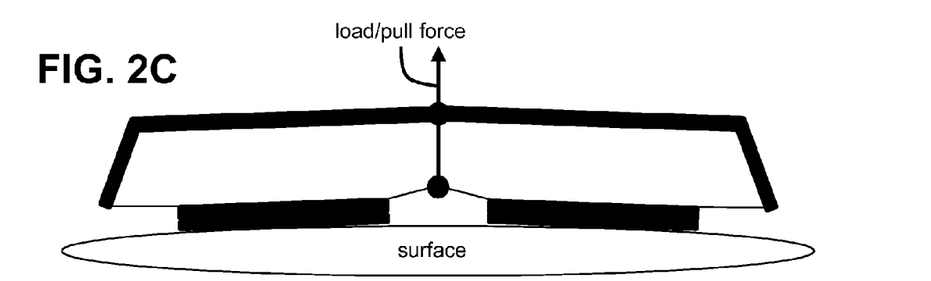
Figure 2D:
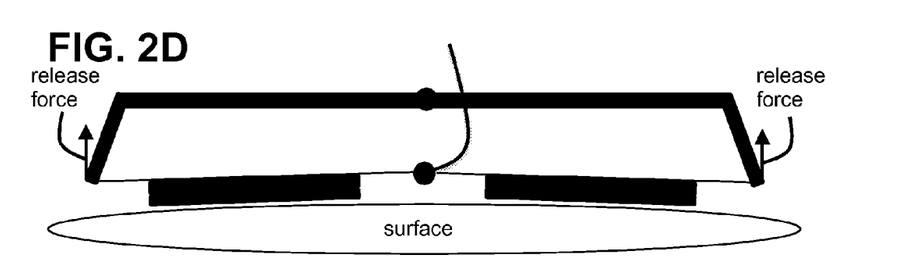
Figure 3B:
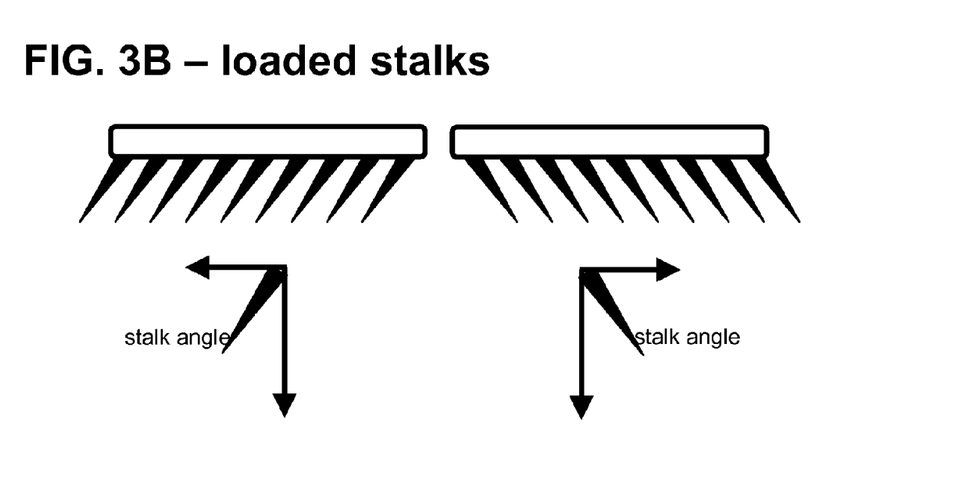

FIGS. 1B-D display a cycle of a grasping device approaching and contacting a surface (FIG. 1B), the load tendon pulling the synthetic dry adhesives closer together and therewith the stalks grasping onto the surface (FIG. 1C) and the release of the load tendon allowing the synthetic dry adhesives to spread away from each other due to the fact that the stalks release their grasping force at the surface (FIG. 1D). FIGS. 2B-D is a similar series of events as in FIG. 1B-D with the difference that the grasping device is now contacting a curved surface and the synthetic dry adhesives are aligning to the surface curvature which is established by the hinged support frame.

As one would readily understand, various synthetic dry adhesives alignment mechanisms could be used to align the synthetic dry adhesives relative to the contact surface. These mechanisms could be passive or active mechanisms. To accommodate for curvatures in the contact surface the support frame include a hinge mechanism (which is the difference between (FIG. 1A for flat surface and FIG. 2A for curved surface). The synthetic dry adhesives could include a backing for the stalks such that the backing is a conforming (i.e. flexible) backing conforming to the contact surface, a compliant backing compliant to the contact surface, or a stiff backing being rigid relative to the contact surface. In some embodiments the backing could be a tile.

Functional Principles and Considerations—I

Grasping a surface dynamically requires several properties for the gripper, whether for perching MAVs on a surface in Earth's gravity or grappling a target in space. Here we generalize the problem of dynamic surface grasping and describe several functional principles that must be embodied by a gripper using directional adhesives tiles.

Dynamic Passive Alignment

Figure 4A:
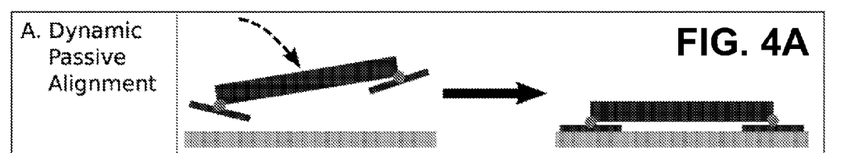
FIGS. 4A-F show according an exemplary embodiment of the invention some functional principles and considerations for grasping devices and mechanisms.

When a grasper first makes contact with the surface, it is unlikely that the adhesive tiles will be aligned. Hence the grasper must compensate for misalignment before or during the collision (FIG. 4A). A passive alignment system can be lighter, simpler, and more robust than an actuated system.

For a passive system, it is important that the work required for alignment is small compared to the grasper's kinetic energy to prevent rebounding before alignment has occurred. The system should therefore have low moments of inertia and rotational stiffnesses.

Rebound Mitigation

Figure 4B:
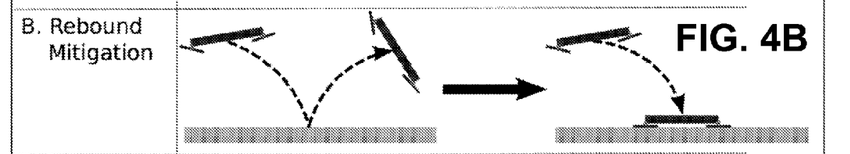

The remaining kinetic energy of the grasper must be absorbed during the collision or during rebound (FIG. 4B). The maximum energy that can be absorbed is limited by the size of the device and the energy absorbing force. The energy absorbing force is itself limited. During collision, it must not damage the device; and during rebound, it must not exceed the adhesion limits of the adhesive tiles.

Adhesive Loading

Figure 4C:
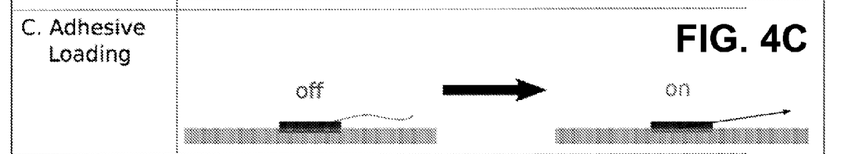

Unlike pressure sensitive adhesives, directional adhesives are not sensitive to normal preload—simply pressing them into the surface will not make them stick. Directional adhesives produce negligible adhesion unless shear force is applied in the correct direction to turn the adhesive "ON" (FIG. 4C). To support normal loads without shear, the grasper must use multiple tiles of directional adhesive, which are loaded with internal shear forces in opposing directions.

With an appropriate mechanism, the energy of the collision can be exploited to passively create these forces and turn the adhesives "ON" at the appropriate time. Excessive shear force will cause the directional adhesives to fail, so the mechanism must ensure the shear force lies within acceptable limits. The excess energy must be dissipated or stored elsewhere. Alternatively, the forces may be produced by an active mechanism. All adhesive tiles must be aligned and in contact with the surface before the adhesives are loaded, so an active mechanism must have accurate sensing to ensure correct timing.

System Locking

Figure 4D:
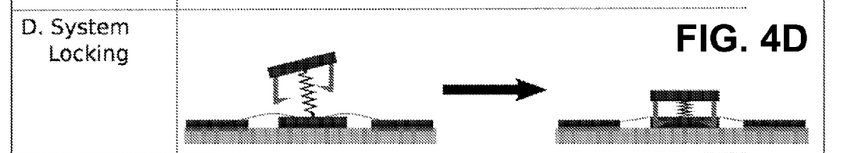

Once the internal shear force has been applied to the adhesives and as much energy as possible has been absorbed during the collision, the grasper must enter a locked state to keep the internal shear forces in place and store the absorbed energy (FIG. 4D). This can be achieved passively using a ratchet or latch.

Resistance to Arbitrary Wrenches

Figure 4E:
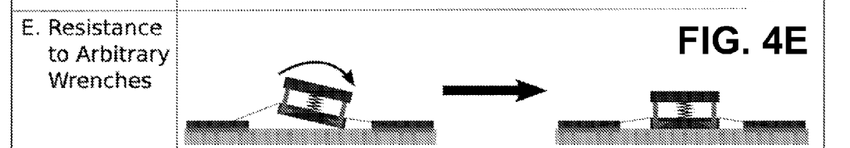

The grasper must be able to support arbitrary wrenches, i.e. combinations of applied forces and moments (FIG. 4E). Ideally, the grasper mechanism should distribute these loads optimally to limit the maximum force on the adhesive, so that the grasper's force limit equals the combined force limits of the separate individual adhesive tiles.

This is not straightforward because the tiles are initially misaligned on the surface, and their positions change during the collision. Therefore, the grasper mechanism must compensate by taking up any slack in the loading tendons, and it must distribute loads optimally despite this compensation.

Releasing the Grasp

Figure 4F:
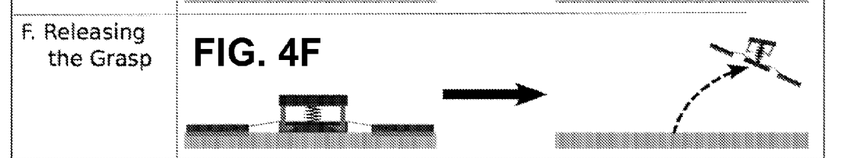

For directional adhesives, it is not necessary to apply a detachment force. When releasing the grasp is desired, a release mechanism can disengage the system lock to release the internal shear loads and turn the adhesives "OFF." This allows the stored energy, if any, to push the surface and grasper apart (FIG. 4F).

Design

Two exemplary designs are described that display the functional principles of dynamic surface grasping. The first, a collapsing truss design, is sized for use on a MAV. The second, a pivoting linkage design, has been sized and fabricated both for use on a MAV and as a prototype for future use in Earth orbit to grapple orbital debris.

Collapsing Truss Grasper

Figure 5A:
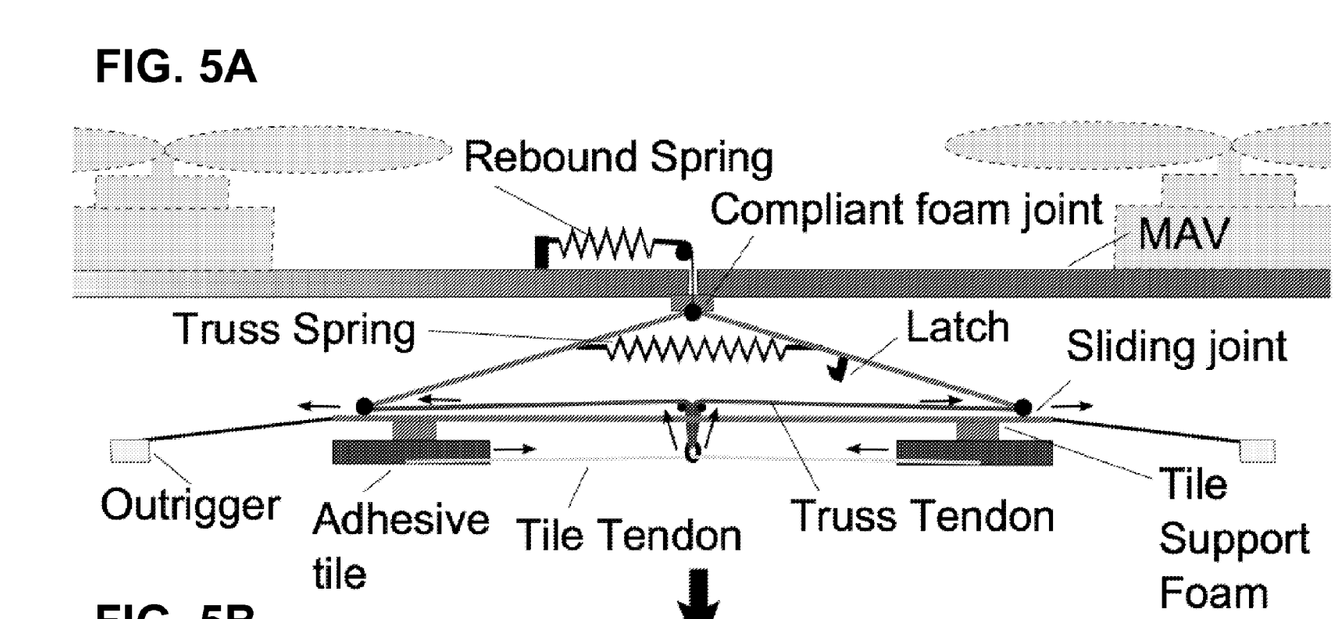
FIG. 5A shows a schematic showing the functional components.
Figure 5B:
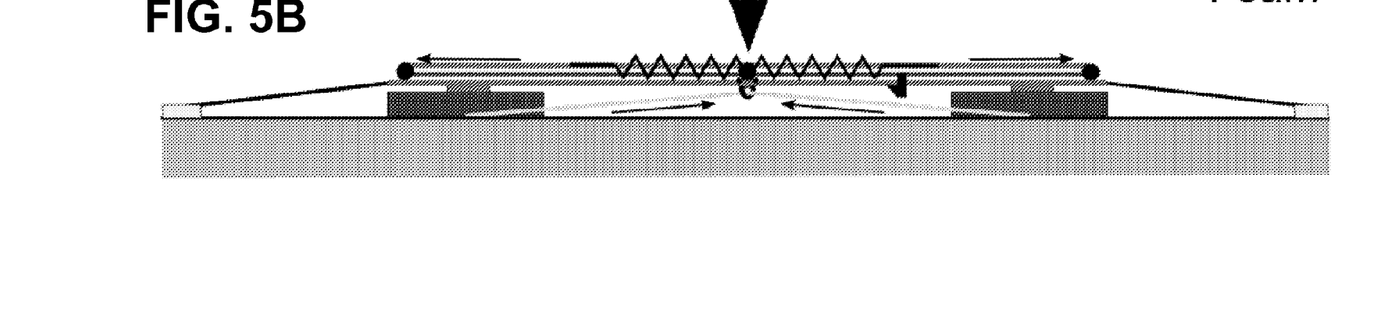
FIG. 5B shows the device in locked state (i.e. grasping a surface).

This grasper design is based on a collapsing truss mechanism (FIGS. 5A-B). It is designed as low-mass landing gear (3.5 g) for a 120 g MAV, and uses 2 adhesive tiles (1×1 cm square). To decrease the pitch-back moment when the MAV is attached to a wall, the Collapsing Truss Grasper is designed to be low profile in the collapsed position. The grasper is designed in accordance with the functional principles described supra.

The truss is attached to the MAV at its apex by a single tendon, which passes through a compliant foam joint, which keeps the grasper aligned to the MAV during flight but allows it to rotate and translate during a collision. Translation is necessary because one tile of adhesive makes contact before the other, and the tiles resist sliding. The grasper uses a set of outriggers to decrease the alignment force and ensure it is partially aligned before contact (Dynamic Passive Alignment).

As the truss collapses, the Truss Tendon routed between the two legs of the truss becomes taut. This pulls the center of the Tile Tendon against the bottom of the truss, applying shear forces to the adhesive tiles and turning them "ON." The internal shear force is limited by the length of the Truss Tendon (Adhesive Loading). Energy is absorbed during the collision by the Truss Spring. When the truss collapses fully, a latch engages to lock the truss in the collapsed state (System Locking) If desired, the stiffness of the Truss Spring can be adjusted to reduce the amount of normal force required to collapse the truss to 0.3 N, which is the minimum force needed to align the pads to the surface. Extra energy is absorbed by the Rebound Spring, which is attached to the tendon through the compliant foam joint (Rebound Mitigation). This spring is preloaded in order to keep the truss pulled tight to the MAV and because a preloaded spring can absorb more energy in this situation.

Once the grasper is locked in place, the Tile Tendon remains under tension and stays at an essentially constant angle, geometrically defined by the length of the Tile Tendon and the distance between the tiles. When a large external load is applied (e.g. wind on the MAV), this load is distributed between the two tiles and additional tension is applied to the Tile Tendon, adding more internal shear force, which produces more adhesion due to the directional nature of the adhesives (Resistance to Arbitrary Wrenches). The Tile Tendon angle can be fine-tuned to change the performance characteristics of the grasper.

Pivot Linkage Grasper

The other grasper design uses a pivoting linkage to apply tension to the Tile Tendons. Unlike the Collapsing Truss Grasper, the adhesive tiles are loaded with semi-independent mechanisms, so the Pivot Linkage Grasper can have a larger number of adhesive tiles. Two versions of this design are presented, each using 4 adhesive tiles: The MAV Pivot Linkage Grasper is designed as landing gear for a 120 g MAV and uses 1×1 cm square adhesive tiles (FIGS. 6A-B) and the Space Pivot Linkage Grasper is designed as a prototype for grappling operations in Earth orbit and uses 4×4 cm square adhesive tiles.

Figure 6A:
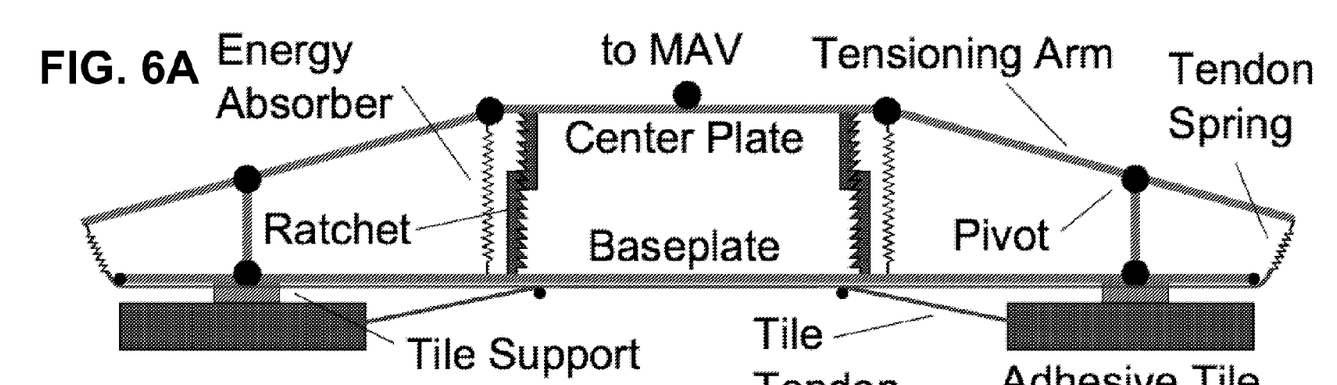
Figure 6B:
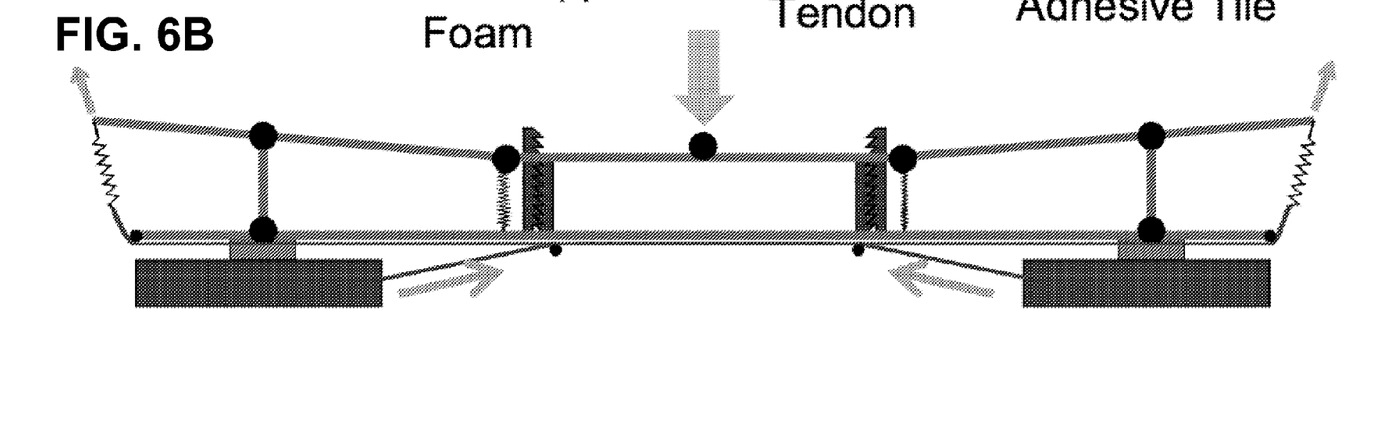
FIG. 6B shows the device in locked state (i.e. grasping a surface).

The mechanisms are actuated by pressing the Center Plate and the Baseplate together. This causes the Tensioning Arms to rotate around the Pivots and apply force to the Tile Tendons through the Tendon Springs. The MAV version uses tendons that pull inwards, crossing under the center of the Baseplate for compactness, while the Space version uses tendons that pull outward to enable grasping flexible surfaces such as thermal blankets.

The MAV Pivot Linkage Grasper uses the energy of collision to turn "ON" the adhesive tiles. It requires a larger normal preload force than the Collapsing Truss Grasper to apply the internal shear forces to the adhesive tiles. This is partly because it has less mechanical advantage, but also because the system of 4 tiles is over-constrained and therefore some amount of preload is necessary to deflect the Tile Support Foam and bring all tiles into contact. Once the tiles make contact, the Tendon Springs compensate for any initial misalignment of the adhesive tiles. In the MAV grasper, the Tendon Springs are preloaded and nonlinear, producing a nearly constant force over a large range of deflection to ensure that all 4 tiles are loaded evenly throughout the collision. The Space Pivot Linkage Grasper works similarly but can also load the tendons after only a small collision by turning its Leadscrew. This actively applies the shear load to the adhesive tiles, so preload during the collision is only required to deflect the Tile Support Foam and align the tiles to the surface. In the Space grasper, the Tendon Springs are linear, but the Leadscrew allows the grasper to control the tension as necessary. For example, a lower tension could be used when grasping a rougher surface to prevent the adhesives from failing prematurely, but a higher tension could be used on a smoother surface to increase the grasper's load-bearing capacity.

Kinetic energy is absorbed by the Energy Absorbers and locked in place using ratchets or a Ratcheting Nut. These ratchet systems may lock at multiple points, which allows the Pivot Linkage Graspers to absorb a variable amount of energy during different collisions (unlike the Collapsing Truss Grasper). In addition, the Energy Absorbers have nonlinear stiffness to provide maximum deceleration in a short distance. A rebound spring may be added to the MAV grasper to absorb additional energy; alternatively, the Space grasper is intended to be mounted on a compliant robotic arm, which may be used for active rebound mitigation.

Fabrication

The MAV graspers have been fabricated using fiberglass and acetal laser-cut parts, carbon fiber rods, silicone open-cell foam, and kevlar braided cord. The Collapsing Truss Grasper has dimensions 50×20×8 mm in the locked state. The Space grasper is fabricated using 3-D printed parts (fused filament fabrication), laser cut acrylic, braided line and other off the shelf components.

The directional adhesive used in these mechanisms is fabricated by casting PDMS silicone into a mold created using a photolithographic process (Parness et al. in a paper entitled: "A microfabricated wedge-shaped adhesive array displaying gecko-like dynamic adhesion, directionality and long lifetime," *J. Royal Society, Interface*, vol. 6, no. 41, pp. 1223-1232, March 2009). This produces a 300-400 µm thick film with an array of 80 µm tall angled micro-wedges. A thin, smooth PDMS film is then deposited on the tips of the features through a post-treatment process involving dipping them into uncured PDMS and then pressing them against a wafer (Day et al. in a paper entitled: "Micro-wedge machining for the manufacture of directional dry adhesives," *Journal of Micro and Nano-Manufacturing*, 2013 (in press)), causing a change in shape and surface smoothness on the engaging surfaces. After post-treatment, the back side of the film is glued to a fiberglass sheet using RTV silicone adhesive (Smooth-On Sil-Poxy), and the fiberglass sheet is then cut into tiles using a laser cutter. Tendons made of kevlar braided cord are attached to the front center of the tiles and routed through rectangular cutouts, in a similar design to adhesive tiles developed previously (Hawkes et al. in a paper entitled: "The gecko's toe: Scaling directional adhesives for climbing applications,"*Mechatronics, IEEE/ASME Transactions on*, vol. 18, no. 2, pp. 518-526, 2013).

Functional Principles and Considerations—II

Design Requirements

In the design of a grasping device or gripper for flat surfaces, there are a number of desirable characteristics. First, the gripper should require very little normal force to engage with the surface. While there is often a large transient normal force involved during certain applications like perching, in other tasks, such as picking up large, thin sheets of glass or grappling free-floating space debris, a large normal force to engage the adhesive is detrimental. Second, the gripper should use the adhesive efficiently to maximize load capability, loading the entire adhesive area evenly and avoiding stress concentrations. Third, the gripper should support loads in any direction in the half-space above the surface. Finally, the gripper should release from the surface when desired with very little normal force.

Design Solution

Microwedge Adhesive

Figure 7A:
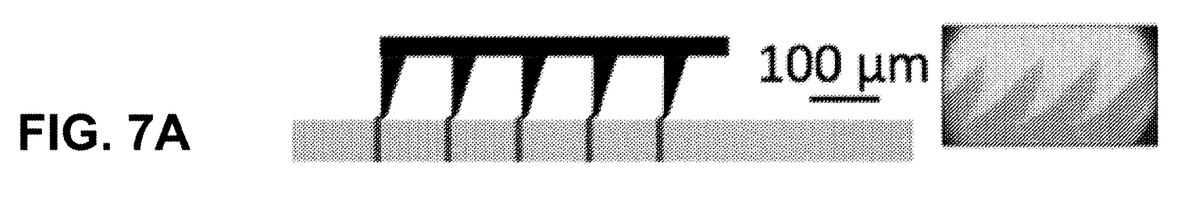
Figure 7B:
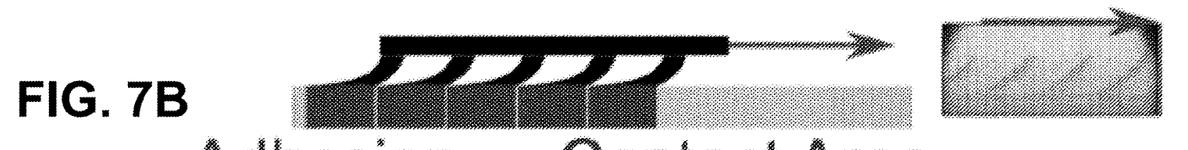
FIG. 7B shows that load in shear enhances engagement (micrograph shown at right). Adhesion is proportional to contact area, meaning fully engaged adhesive can support large loads.
Figure 7C:
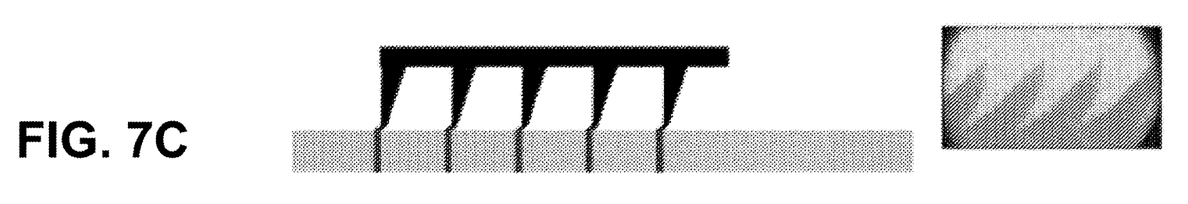
FIG. 7C shows that engagement decreases when the load is removed; low contact area results in small load required for removal (micrograph shown at right).

The key technology that makes the gripper possible is controllable gecko-inspired dry adhesives. The dry adhesive used here is polydimethosiloxane (PDMS) microwedges or stalks (FIGS. 7A-C), which has the characteristic of controllability, or the ability to engage more fully with the surface when loaded in shear, and to disengage with the surface spontaneously when unloaded. Controllability has been documented in the adhesive of the gecko, and functionally allows the adhesive to be turned on or off. This is crucial for meeting the first and last requirements that dictate low pressing normal force for engagement and low pulling normal force for disengagement, respectively. To engage the stalks or microwedges, the adhesive only needs to be brought into contact with the surface, without any pressing normal force; the thin tips of the wedges are pulled into contact when they are within a few micrometers of the surface (FIG. 7A). At this point, only a small percentage of the adhesive is in contact with the surface, but if the adhesive is then loaded in shear, the wedges roll onto the surface from tip to base, increasing engagement (FIG. 7B). Because adhesion is roughly proportional to contact area, large loads can now be supported. When the shear load is removed, elastic energy stored in the deformed wedges pops them off the surface almost instantaneously (FIG. 7C). Here, only the very tips of the wedges are in contact, and the adhesive can be removed from the surface with very little applied normal force.

Tile Tendon

To achieve the second design requirement, i.e. the ability to evenly and uniformly load the adhesive, it is possible to mount the adhesive on a rigid tile and load the tile through its center of pressure with a tendon. This method is a viable option when it is known that the adherent surface is relatively flat at the length scale of a tile; the tile must be small enough such that the non-flatness in the adherent surface can be made up for by the compliance of the fibers in the adhesive. For microwedges, there is a approximately a 35 µm window over which the fibers can adhere, meaning the adherend surface must be flat within 35 µm across the scale of the tile. Throughout this example, 2.5 cm×2.5 cm tiles are used, each with a mass of grams.

Gripper or Grasping Device

Figure 8A:
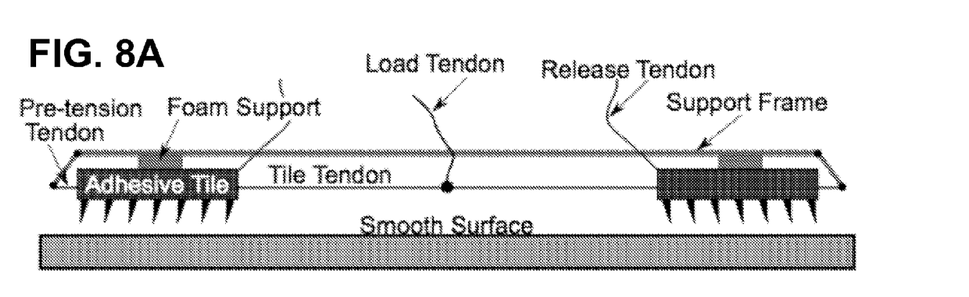

Two rigid tiles with microwedge adhesive are oriented in opposition, with the Tile Tendon (also referred to as medial pre-tension tendon) of each directed toward the center of the gripper (FIG. 8A). Here the two Tile Tendons meet at a node with the Load Pull Tendon, through which external forces are applied to the gripper. The Frame supports the two tiles while they are not in contact with a surface. It is rigid with two compliant flexures at either end, which keep the Lateral Pre-tension Tendons and the Tile Tendons taut. In this way, the tiles are kept in a line along the bottom of the Frame when not in contact with a surface, and the Tile Tendons are kept parallel to the frame. The gripper made with two 2.5 cm square tiles is approximately 9 cm wide, 1 cm tall, and has a mass of 12 g. A smaller version, using 1 cm×1 cm tiles weighs only 1.2 g total.

Figure 8B:
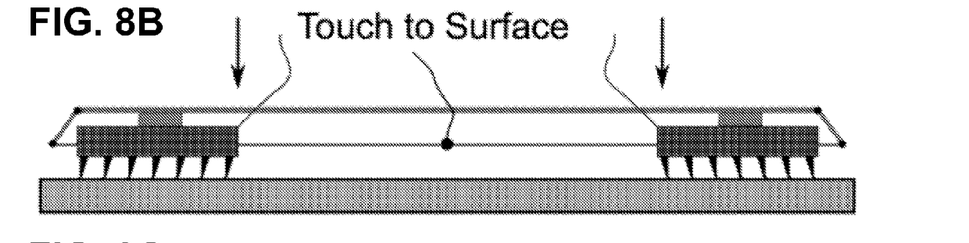
FIG. 8B shows that the gripper is first brought into contact with the surface.

During use, the gripper is first brought into contact with the surface (FIG. 8B). A compliant Foam Support behind the tile could act as a pivot, allowing the tiles to roll side-to-side, enabling passive alignment. In the long axis of the device, the tiles are constrained to be in a line by the Pre-tension and Tile Tendons, thus the device should be passively aligned to the surface along this axis. This alignment can be achieved with a pin joint at the top of the frame.

Figure 8C:
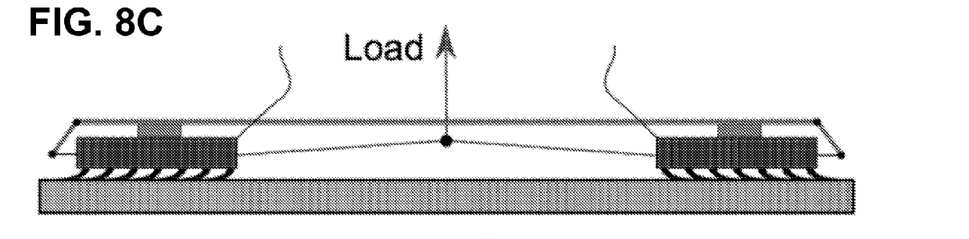
FIG. 8C shows that next, the load/pull Tendon is pulled, engaging the adhesive and allowing the device to support a load.
Figure 8D:
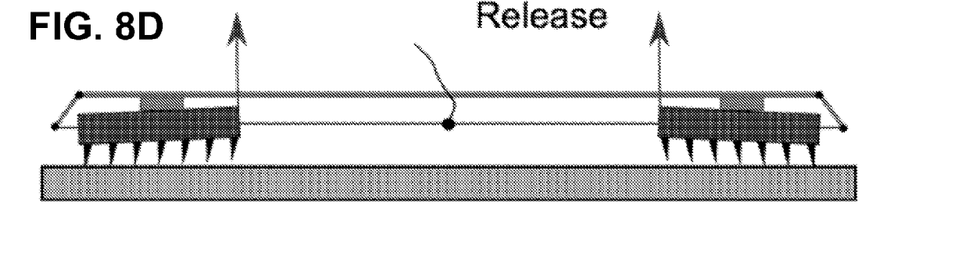
FIG. 8D shows that when the load is removed, the adhesive passively disengages, and the gripper can be easily removed from the surface.
Figure 9A:
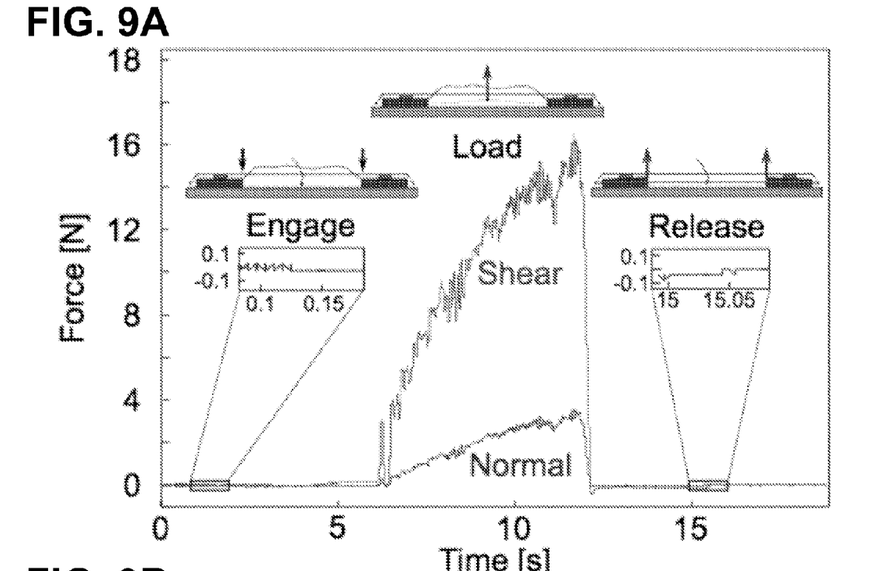
Figure 9B:
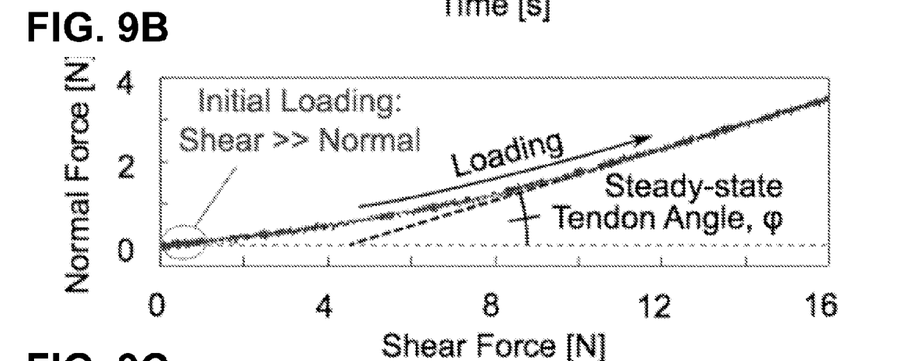
FIG. 9B shows the total force during loading. Initial load is mostly shear, which engages the adhesives before the normal component is added.
Figure 9C:
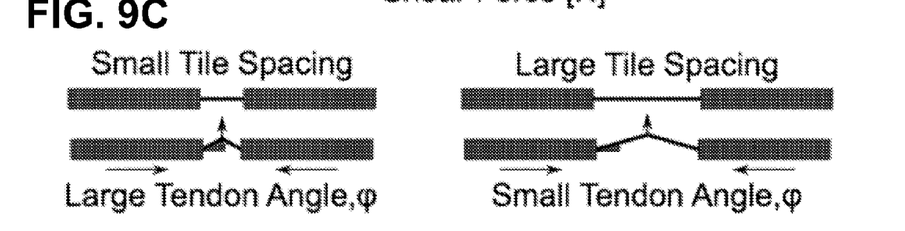
FIG. 9C shows that tile spacing can be used to determine tendon angle.

Once contact is made with the surface, the Load Tendon is pulled, which in turn tensions the two Tile Tendons (FIG. 8C). Initially, the load is mostly in shear; shear before normal is crucial because it engages the adhesives before pulling them away from the surface. As the load increases, the angle of the two Tile Tendons with respect to the surface increases (the tendon angle), applying a normal load to the engaged adhesives. A plot of the forces exerted by one of the tiles on the surface shows this effect (FIG. 9A-C).

It is crucial to note that while the angle at which the tendon is pulled initially changes, it remains constant for the rest of the loading cycle. It is this steady state angle that is referred to as the tendon angle. The tendon angle can be increased by decreasing the spacing between tiles, since there is essentially a fixed shear displacement during loading as the wedges lay over (approximately 75 µm) and a fixed amount of low-stiffness stretch in each Tile Tendon (The tendons are initially low stiffness as they become fully straight. Once straight, they are assumed inextensible) (approximately 12 µm). A smaller distance between tiles means shorter Tile Tendons, and thus a larger tendon angle as the tiles shear toward one another and the tendons stretch slightly (FIG. 9C). The attachment point of the Load Tendon to the Tile Tendons is fixed; the Load Tendon cannot slide along the Tile Tendon one-way or the other. Offsetting this attachment point makes one Tile Tendon longer and one shorter, which in turn makes one tendon angle smaller and one larger, respectively.

The Load Tendon can be pulled in any direction in the half-space above the surface, while the tensions in the two Tile Tendons vary to sum to the tension in the Load Tendon. The magnitude of the load, which can be supported, depends on the design of the device and the layout, which sets the tendon angles, the direction of the load, and the loading rate.

The gripper releases easily from the surface once the tension is removed from the Load Tendon, because each 100 µm tall adhesive wedge spontaneously springs back from the surface, with only the tip of the wedge remaining in contact. The device can be lifted off the surface by either lifting the frame or pulling the Release Tendon; both lift the tiles without engaging the adhesive. The release force was measured as 1200 times less than the force the device supports in normal.

Functional Principles and Considerations—III

In another example, a grasping device is described having a support frame with a top surface, a bottom surface and lateral sides. The support frame supports two synthetic dry adhesives, spaced from each other, underneath its bottom surface with the top surfaces of the adhesives facing the bottom surface of the support frame. A medial pre-tension tendon connects the medial sides of the first and second synthetic dry adhesive. Lateral pre-tension tendons connect the lateral side of the synthetic dry adhesives with the nearest lateral side of the support frame. The support frame is compliant in order to apply a pre-tension to the pre-tension tendons (medial and lateral).

The bottom surfaces of the synthetic dry adhesives have a plurality of stalks. Each of the stalks make an acute angle with the respective bottom surfaces and the respective lateral sides of the bottom surfaces such that the stalks are pointing to the lateral side of their respective synthetic dry adhesives and such that the acute angles of the stalks of the first synthetic dry adhesive are opposite from the acute angles of the stalks of the second synthetic dry adhesive.

A pull tendon is connected near or at the middle of the medial pre-tension tendon, which is capable of pulling the medial and neighboring sides of the first and second synthetic dry adhesives closer to each other through the action of the medial pre-tension tendon by applying tension at the medial sides of the first and second synthetic dry adhesives.

While the medial and neighboring sides of the first and second synthetic dry adhesives are being pulled closer to each other, the tension in the medial pre-tension tendon is initially greater than the tension in the lateral pre-tension tendons resulting in a net shear force on the first and second synthetic dry adhesives which loads the stalks in shear, and (ii) while an increase in pull force at the pull tendon increases the angle at the medial pre-tension tendon with respect to the top surfaces of the first and second synthetic dry adhesives, which increases a normal component of a force applied to a contact surface, and wherein the applied force is capable of supporting external load applied to the pull tendon.

The invention claimed is:

1. A grasping device, comprising:
   a support frame with a top surface, a bottom surface and lateral sides;
   a first synthetic dry adhesive with a top surface, bottom surface, a lateral side and a medial side;
   a second synthetic dry adhesive with a top surface, bottom surface, a lateral side and a medial side;
   a first lateral pre-tension tendon;
   a second lateral pre-tension tendon;
   a medial pre-tension tendon; and
   a pull tendon;
   wherein the support frame supports underneath its bottom surface the first synthetic dry adhesive and the second synthetic dry adhesive,
   wherein the first and second synthetic dry adhesive are spaced from each other,
   wherein the top surfaces of the first and second synthetic dry adhesive faces the bottom surface of the support frame,
   wherein the medial pre-tension tendon connects the medial sides of the first and second synthetic dry adhesive,
   wherein the first lateral pre-tension tendon connects the lateral side of the first synthetic dry adhesive with a first lateral side of the support frame,
   wherein the second lateral pre-tension tendon connects the lateral side of the second synthetic dry adhesive with a second lateral side of the support frame,
   wherein the bottom surfaces of the first and second synthetic dry adhesive comprises a plurality of stalks, wherein an angle of each of the stalks make an acute angle with the respective bottom surfaces and the respective lateral sides of the bottom surfaces such that the stalks are pointing toward the lateral side of their respective synthetic dry adhesives and such that the acute angles of the stalks of the first synthetic dry adhesive are opposite from the acute angles of the stalks of the second synthetic dry adhesive,
   wherein the pull tendon is connected to the medial pre-tension tendon and wherein the pull tendon is capable of pulling the medial sides of the first and second synthetic dry adhesives closer to each other through the action of the medial pre-tension tendon by applying tension at the medial sides of the first and second synthetic dry adhesives, and
   wherein (i) while the medial sides of the first and second synthetic dry adhesives are pulled closer to each other, the tension in the medial pre-tension tendon is initially greater than the tension in the lateral pre-tension tendons resulting in a net shear force on the first and second synthetic dry adhesives which loads the stalks in shear, and (ii) an increase in pull force at the pull tendon increases the angle of the medial pre-tension tendon with respect to the top surfaces of the first and second synthetic dry adhesives, which increases a normal component of an applied force applied to a contact surface, which is capable of supporting an external load applied to the pull tendon.

2. The grasping device as set forth in claim 1, wherein the support frame comprises a plurality of synthetic dry adhesive pairs.

3. The grasping device as set forth in claim 1, wherein the support frame comprises a hinge mechanism to accommodate for curvatures in the contact surface.

4. The grasping device as set forth in claim 1, wherein the support frame is compliant to apply a pre-tension to the first lateral pre-tension tendon, the second lateral pre-tension tendon and the medial pre-tension tendon.

5. The grasping device as set forth in claim 1, wherein the synthetic dry adhesives comprise a backing for the stalks, wherein the backing is a conforming backing conforming to the contact surface, a compliant backing compliant to the contact surface, or a stiff backing being rigid relative to the contact surface.

* * * * *